(12) United States Patent
Cardwell

(10) Patent No.: US 7,638,962 B2
(45) Date of Patent: Dec. 29, 2009

(54) HATCH COVER MANAGER

(76) Inventor: Michael Cardwell, 2525 W. 65th Ave., Merrillville, IN (US) 46410

( * ) Notice: Subject to any disclaimer, the term of this patent is extended or adjusted under 35 U.S.C. 154(b) by 312 days.

(21) Appl. No.: 11/734,418

(22) Filed: Apr. 12, 2007

(65) Prior Publication Data

US 2007/0241709 A1 Oct. 18, 2007

Related U.S. Application Data

(60) Provisional application No. 60/792,087, filed on Apr. 14, 2006.

(51) Int. Cl.
G05B 5/00 (2006.01)
(52) U.S. Cl. .................. 318/484; 318/443; 318/444
(58) Field of Classification Search .............. 318/484, 318/443, 444, 445, 466, 468; 296/216.02
See application file for complete search history.

(56) References Cited

U.S. PATENT DOCUMENTS

| | | | |
|---|---|---|---|
| 3,557,497 A | 1/1971 | Schafer et al. | |
| 4,415,197 A | 11/1983 | Meyer | |
| 5,417,148 A * | 5/1995 | Cavallo | 99/334 |
| 6,021,606 A | 2/2000 | Kos | |
| 6,442,896 B1 | 7/2002 | Chapin, III | |
| 6,572,182 B2 | 6/2003 | Lamparter et al. | |
| 6,952,996 B2 | 10/2005 | Sisk et al. | |
| 2004/0124662 A1 * | 7/2004 | Cleland et al. | 296/146.4 |
| 2004/0135531 A1 * | 7/2004 | Graham et al. | 318/442 |
| 2006/0187034 A1 * | 8/2006 | Styers et al. | 340/545.1 |

* cited by examiner

*Primary Examiner*—Karen Masih
(74) *Attorney, Agent, or Firm*—David J. Bremer

(57) ABSTRACT

The hatch cover manager product monitors hatch cover conditions and can move the cover to a closed position when the cover is left open and the hatch opening is not in use. The product minimizes the probability that the person using the walking surface will accidentally step into the uncovered hatch opening and fall to the surface below.

10 Claims, 2 Drawing Sheets

HATCH COVER MANAGER

The invention is a hatch cover manager product for controlling a cover on a hatch opening in a roof, floor, gangway, and various other walking surfaces.

The hatch opening provides access through the walking surface, to and from an adjacent walking surface. For example, a hatch opening in a floor can provide access to a basement surface, and a hatch opening in a roof can provide access to the roof from a floor below. Stairways and ladderways often utilize a hatch opening through the walking surface to provide access between adjacent surfaces.

The hatch cover is used to block the hatch opening and to prevent accidental passage through the opening by objects and persons. Additionally, the hatch cover can be used to block the hatch opening between an exterior space and an interior space so that precipitation, debris, and wind do not enter the interior space through the opening. Additionally, the hatch cover can prevent an unauthorized person from accessing the walking surface and from passing from one surface to an adjacent surface.

The hatch cover manager product monitors hatch cover conditions and can move the cover to a closed position when the cover is left open and the hatch opening is not in use. The product minimizes the probability that the person using the walking surface will accidentally step into the uncovered hatch opening and fall to the surface below. The product also minimizes the probability that an object, such as a tool, will be dropped through the opening.

Current US regulations for workplace safety require the installation of guardrails and other safety equipment around open roof hatches to prevent accidents resulting from open hatch covers unless a human safety monitor is present. The roof hatch manager product is a safer, more effective and superior alternative to the existing safety equipment mandated for protecting open hatch covers because it is provides passive compliance and minimizes open hatch occurrences due to human error.

Additionally, the hatch cover can be locked to prevent unauthorized access through the hatch opening. Unlocking the hatch cover, especially from below the hatch cover, can cause a safety problem for a person unlocking the cover. For example, when the hatch opening serves a ladderway, unlocking the hatch cover can require the person to release the ladder with at least one hand, causing a potential falling safety problem.

An embodiment of the product enables a person to unlock the hatch cover remotely, for example from the walking surface below the hatch opening, without climbing the ladder. After the hatch cover is unlocked the person can climb the ladder and pass through the hatch opening in a safer manner.

DRAWINGS

The hatch cover manager product monitors hatch cover conditions and can change a hatch cover condition. For example, the product can move the hatch cover from an open position to a closed position.

The product can help to prevent hatch opening accidents by sensing when the cover is open and then automatically closing the cover after specified time elapses.

The product comprises a controller, a cover-open sensor, a timer, and a cover actuator. The controller monitors the cover-open sensor for a cover-open condition, monitors the timer for a time condition to determine if specified time has elapsed, and can respond to the cover-open condition and the time condition by causing the cover actuator to move the hatch cover from an open position to a closed position.

The controller is signal-connected to the cover-open sensor, to the timer, and to the cover actuator, and the controller can detect signals and can send signals between the controller and the sensor, the timer, and the actuator.

A "signal" from a product part to a second product part—and a product part being "signal-connected" to a second product part—here and throughout mean that a physical state of the product part causes a second physical state of the second product part. This can occur by various direct causal means and can occur by any of various transmitted signals. Transmitted signals can be various point-to-point and broadcast forms of transmission such as wireless and via wires, cable, and fibers.

Parts of transmitted signals can reside with one form of the transmitted signals, parts can reside with a second form of transmitted signal, and parts can reside with various combinations of transmitted signals.

For example, the controller can be signal-connected to the actuator via an actuator signal. The actuator signal can have more than one actuator signal component, each actuator signal component representing a different condition or a different response. Similarly, the controller can be signal-connected to the sensor via a sensor signal. The sensor signal can have more than one sensor signal component, each sensor signal component representing a different condition or a different response.

In a typical example, a person can use the hatch opening to access a roof in order to inspect the roof. The person opens the hatch cover and passes through the opening onto the roof.

In this example, the controller, monitoring the cover-open sensor, detects the cover-open condition and monitors the timer for the time condition. The controller continues to monitor the timer until specified time elapses and the timer signals the time condition. When the controller detects the time condition, the controller responds to the open-cover condition and the time condition by causing the cover actuator to move the cover from the open position to the closed position.

Figure 1:
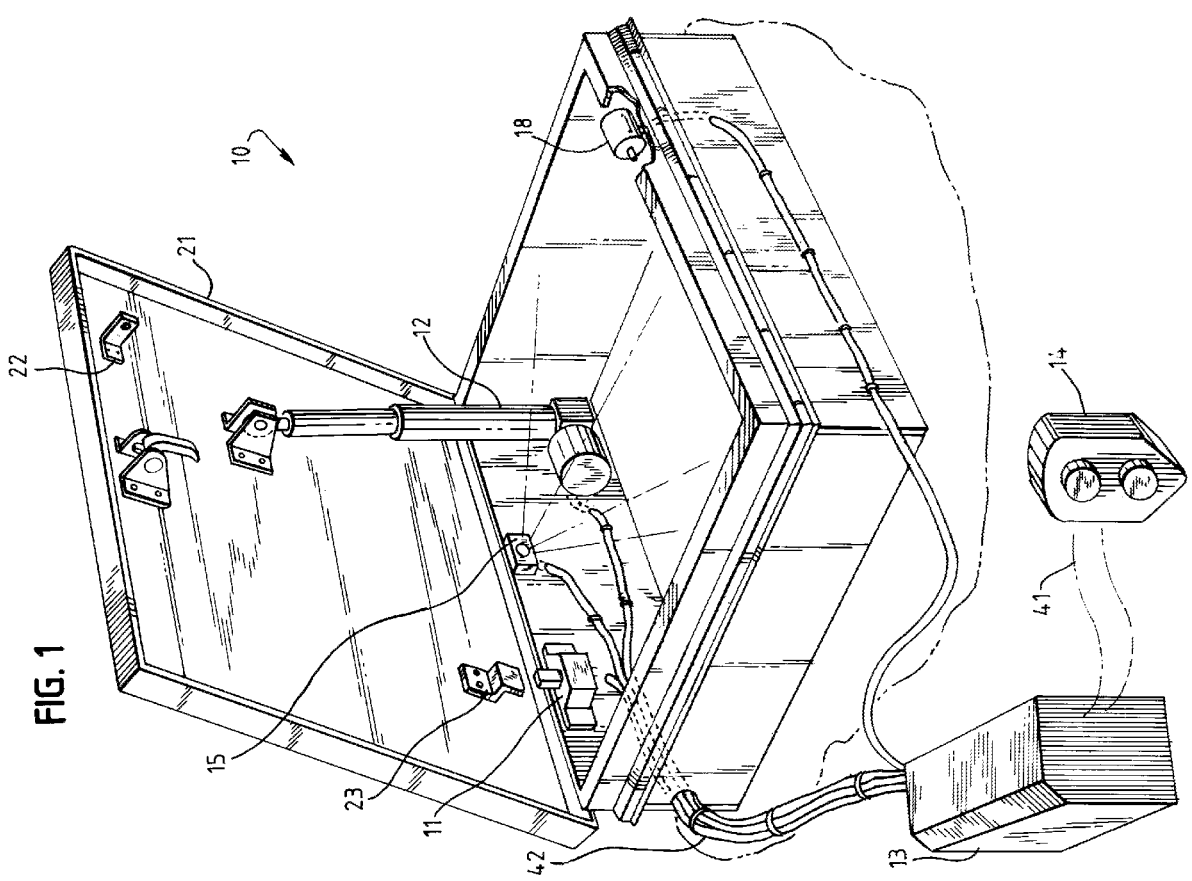
FIG. 1 is a perspective view of an embodiment of the product.

In FIG. 1, the hatch cover manager product 10 comprises a controller 13, a cover-open sensor in this case a contact switch 11, a timer (in this case the timer is a component of the controller), and a cover actuator in this case a linear actuator 12.

Figure 2:
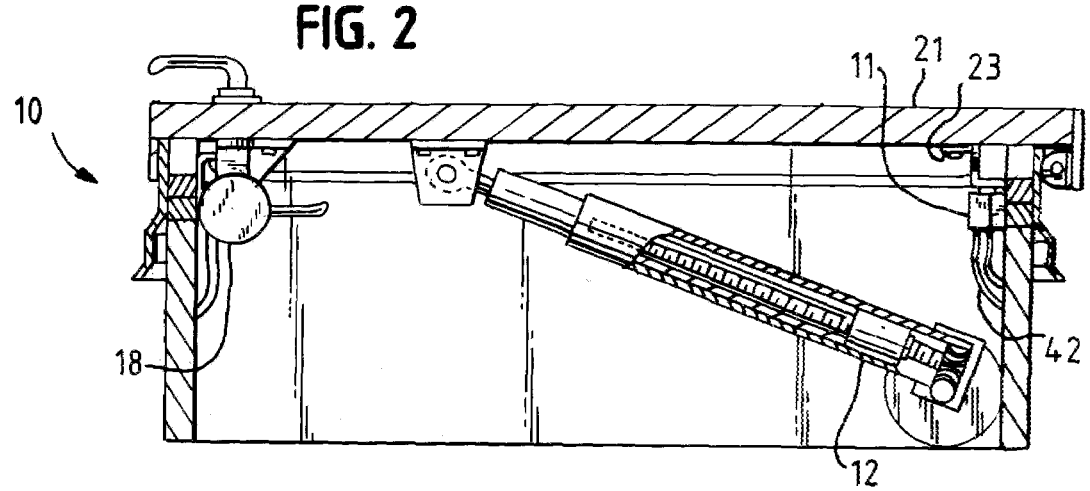
FIG. 2 is a side view of the embodiment of the product.
Figure 3:
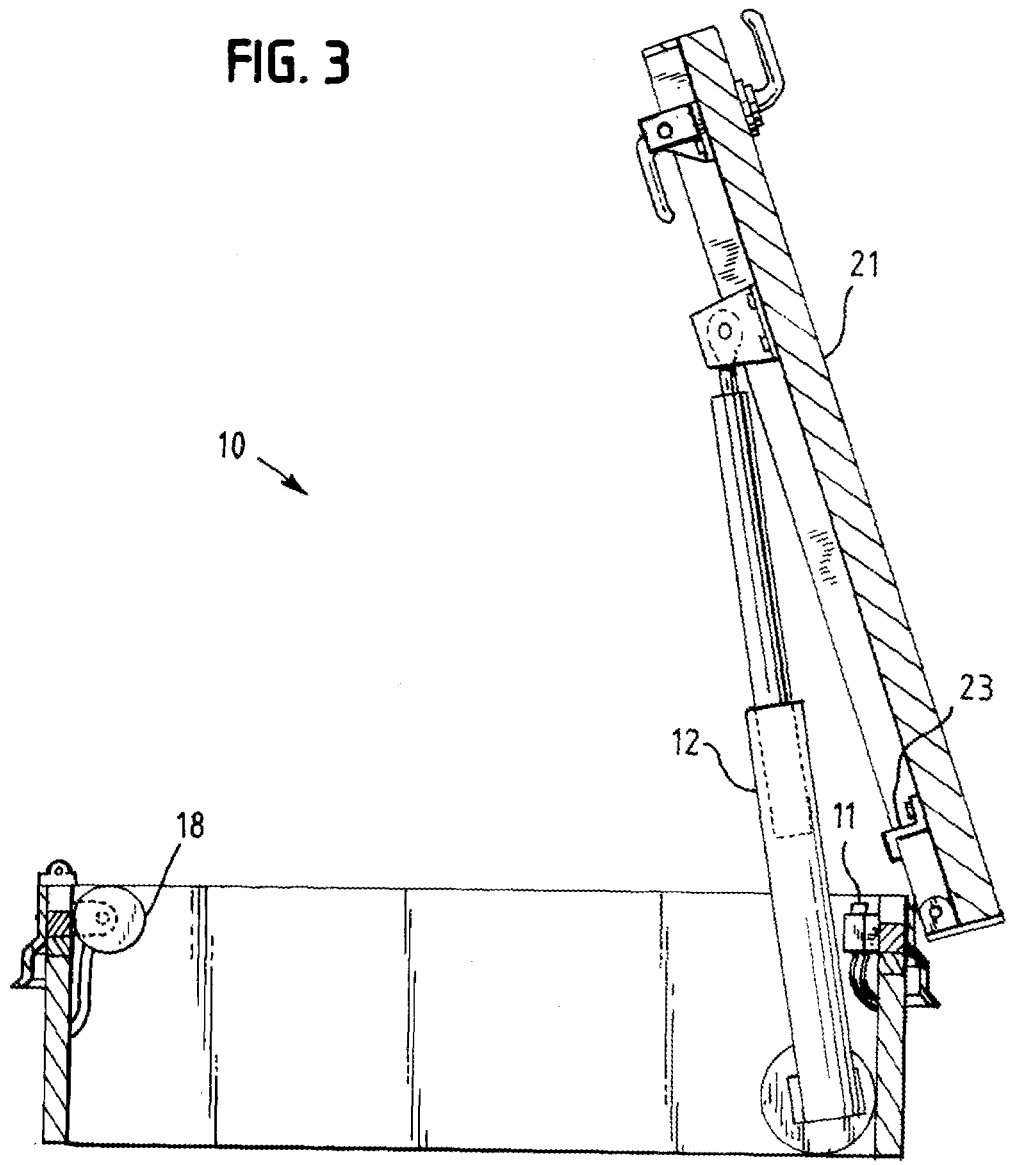
FIG. 3 is another side view of the embodiment of the product.

The contact switch 11 signals a cover-open condition when a cover 21 is in an open position. When the cover 21 is open, as shown in FIG. 3, a switch plate 23 connected to the cover 21 does not contact the contact switch 11 and the controller 13 detects the cover-open condition. When the cover 21 is closed, as shown in FIG. 2, the switch plate 23 contacts the contact switch 11 and the controller does not detect the cover-open condition.

The cover-open sensor can signal the cover-open condition. The cover-open sensor can signal a cover-closed condition and the absence of the cover-closed condition can be interpreted by the controller as the cover-open condition. The cover open-sensor can signal cover conditions between the cover-open condition and the cover-closed condition.

The cover-open sensor can comprise various devices including, but not limited to, an optical proximity sensor, a magnetic proximity sensor, an inclinometer, and various combinations thereof, so long as the cover-open sensor can signal a cover-open condition that can be detected by the controller. The cover-open sensor can be a component of the cover actuator.

The timer can signal elapsed time after the cover-open condition. Alternatively, the timer can signal passing time and the controller can monitor the cover-open condition onset and the controller can monitor specified elapsed time.

The timer can signal the time condition. The timer can signal a no-time condition and the absence of the no-time condition can be interpreted by the controller as the time condition. The timer can signal time conditions between the time condition and the no-time condition.

The timer can be a component of the controller

In the embodiment shown in FIG. 1, the controller 13 causes the actuator 12 to move the cover 21 from the open position to the closed position.

Alternatively, the cover actuator can move the cover from the closed position to the open position. Alternatively, the cover actuator can move between the open position and the closed position.

The cover actuator can comprise various actuators, including, but not limited to, rotary actuators, pneumatic actuators, hydraulic actuators, spring actuators and various combinations thereof, so long as the cover actuator can move the cover from the open position to the closed position.

The cover actuator can have an opening component for moving the cover to the open position.

The cover actuator can have a closing component for moving the cover to the closed position.

The opening component and the closing component can be dissimilar. For example, the cover actuator can have an opening component comprising a linear actuator and a closing component comprising a spring actuator. The opening component and the closing component can be various dissimilar combinations thereof.

The hatch cover manager product can comprise an obstruction sensor. The controller is signal-connected to the obstruction sensor. The controller can monitor the obstruction sensor for a no-obstruction condition.

The controller, monitoring the cover-open sensor, the timer, and the obstruction sensor and detecting the cover-open condition, the time condition and the no-obstruction condition, can respond by causing the cover actuator to move the cover between the open position and the closed position.

The hatch cover manager product 10 has an obstruction sensor, in this case a motion sensor 15. The motion sensor 15 signals the no-obstruction condition unless the sensor senses motion within the hatch opening. The controller 13 monitors the motion sensor 15 for the no-obstruction condition.

The obstruction sensor can be various sensors including, but not limited to, a proximity sensor, a motion sensor, a heat-detecting sensor, a light-detecting sensor, and various other sensors and combinations thereof.

The obstruction sensor can be an infra-red sensor, an ultrasonic sensor, an acoustic sensor, and various other sensing devices.

The obstruction sensor can signal the no-obstruction condition unless the sensor senses an obstruction proximal the hatch opening that can affect the cover moving between the open position and the closed position.

Alternatively, the obstruction sensor can signal the no-obstruction condition unless the sensor senses movement proximal the hatch opening.

Alternatively, the sensor can sense an obstruction and then signal an obstruction condition and the absence of the obstruction condition can be interpreted by the controller as the no-obstruction condition.

Alternatively, the obstruction sensor can sense various conditions and signal the no-obstruction condition in various ways.

The hatch cover manager product can comprise a remote station. The controller is signal-connected to the remote station. The controller can monitor the remote station for a lock-cover command condition. The controller, monitoring the remote station and detecting the lock-cover condition, can respond by causing a cover lock to lock and to unlock the cover.

A person can cause the remote station to signal the lock-cover command condition. Alternatively, the remote station can signal the lock-cover command in response to monitored cover conditions.

The hatch cover manager product 10 has a remote station, in this case a wireless remote 14. The remote 14 is signal-connected to the controller 13 via a wireless signal 41.

The hatch cover manager product 10 has a cover lock, in this case an electric solenoid 18. The solenoid 18 is signal-connected to the controller 13 via a wire 42. The electric solenoid 18 can engage a handle 22 that is connected to the cover 21 and lock the cover 21 in the closed position.

The remote 14 can signal the lock-cover command condition. The controller 13, detecting the lock-cover command condition, can cause the electric solenoid 18 to lock the cover in the closed position.

In some embodiments, the controller can monitor the remote station for an open-cover command condition and for a close-cover command condition. The controller, monitoring the remote station and detecting an open-cover command condition and detecting a close-cover command condition can cause the actuator to move the cover to an open position and to a closed position, respectively.

The remote station can display cover conditions monitored by the controller.

The cover lock locks the cover by limiting cover movement. The cover lock can comprise various locking means so long as the cover lock can hold the cover in the closed position.

The cover lock can be a component of the cover actuator. For example, the cover lock can comprise an internal brake on a rotary actuator and can comprise an internal stop on a linear actuator.

The cover lock can also signal a cover lock condition. The controller can monitor the cover lock for the cover lock condition.

The controller can be signal-connected to the cover lock. Alternatively, the remote station can be signal-connected to the cover lock. Alternatively, the controller and the remote station can be signal-connected to the cover lock.

The controller can comprise a processor. The processor can process monitored cover conditions and can cause the controller to respond to monitored conditions according to programmable instructions.

The processor can process conditions via any of various processing modes. The processor can utilize configurable processing elements such as application-specific integrated circuits, field programmable gate arrays, and neural networks, can utilize instructions in a data-bearing medium, and can utilize various other processing modes and combinations thereof.

The processing can be by standalone means, can act via a local information system, can act via a networked information system, and can act via combinations thereof.

The processing—in part at least—can be by parts of a transducer. The data-bearing medium can be a transmission medium, a data storage medium, and a combination of a transmission medium and a data storage medium.

The processor can provide additional flexibility to the controller in responding to cover conditions.

The controller, via the processor, can respond to similar monitored cover conditions in different ways depending on the programmable instructions. For example, the elapsed time of the time condition can differ depending on the presence or absence of the no-obstruction condition, can differ for subsequent cover-close command conditions after a first cover-close command condition, and can be overridden in response monitored conditions.

Similarly, the controller, via the processor, can respond variously to conflicting monitored conditions, such as concurrent lock-cover command and cover-open conditions.

The controller can store historical data concerning conditions, including but not limited to monitored cover conditions and external conditions. The external conditions can include but are not limited to climate conditions, time and date conditions, utility power conditions, telephonic conditions, and combinations thereof.

The processor can utilize historical data in processing and the controller, via the processor, can respond to monitored conditions and historical data according to the programmable instructions.

The hatch cover manager product can comprise an alarm. The controller is signal-connected to the alarm.

The controller can activate the alarm in response to the cover-open condition and the time condition. Alternatively, the controller can activate the alarm in response to various monitored conditions.

The remote station can cause the controller to activate the alarm.

The hatch cover manager product can comprise an actuator manual override. The actuator manual override enables a person to control the hatch cover directly without controller involvement.

The manual override can cause the cover actuator to move the cover between the open position and the closed position.

The hatch cover manager product can comprise various manual overrides for controlling various product parts, including for controlling the controller.

For example, the product can comprise a cover-open sensor manual override for disabling the cover-open sensor and for causing a cover-open condition without cover-open sensor involvement. Similarly, the product can comprise an obstruction sensor manual override and a cover lock override. Similarly, the product can comprise a controller override for causing various cover conditions without controller involvement and for disabling the controller.

The invention claimed is:

1. A hatch cover manager product comprising:
   a controller being signal-connected to a cover actuator, the cover actuator being connected to a hatch cover capable of covering a hatch opening in a walking surface;
      the cover actuator in use moving the hatch cover to and between an open position and a closed position;
   the controller being signal-connected to a cover-open sensor and monitoring the cover-open sensor for cover condition, the cover conditions comprising:
      a cover-closed condition;
      a cover-open condition;
      a cover-between condition;
   the controller being signal-connected to a timer and monitoring the timer, the timer signaling a time condition, a no-time condition, and a between-time condition; and
   the controller responding to the timer, the cover condition, and external conditions, by causing the cover actuator to either move the hatch cover to the closed position, move the hatch cover to the open position, or not move the hatch cover.

2. The hatch cover manager product of claim 1 wherein the controller further comprises a processor; and
   the controller, via the processor and according to programmable instructions, responds to the timer and the monitored cover condition by causing the cover actuator to either move the hatch cover to the open position, move the hatch cover to the closed position, or not move the hatch cover.

3. The hatch cover manager product of claim 2 wherein
   the controller, via the processor and first programmable instructions, responds to the time condition and the cover-between condition by causing the cover actuator to move the hatch cover to the closed position; and
   wherein the controller, via the processor and second programmable instructions, responds to the time condition and the cover-between condition by causing the cover actuator to move the hatch cover to the open position.

4. The hatch cover manager product of claim 2 wherein the controller is signal-connected to an alarm;
   the controller activating the alarm in response to the cover-open condition and the time condition and the no-obstruction condition.

5. The hatch cover manager product of claim 1 wherein the product further comprises:
   an cover actuator manual override, the cover actuator manual override causing the cover actuator to move the cover to and between the open position and the closed position.

6. The hatch cover manager product of claim 2 wherein the controller is signal-connected to a hatch obstruction sensor;
   the controller monitoring the obstruction sensor for a no-obstruction condition; and
   the controller, via the processor and the programmable instructions, responding to the time condition, the cover-open condition, and the no-obstruction condition, by causing the cover actuator to either move the hatch cover to the closed position, move the hatch cover to the open position, or not move the hatch cover.

7. The hatch cover manager product of claim 2 wherein the controller is signal-connected to a remote station;
   the controller monitoring the remote station for a lock-cover command condition;
   the controller, via the processor and the programmable instructions, responding to concurrent lock-cover command and cover-open conditions by causing the cover actuator to either move the hatch cover to the closed position and lock the cover in the closed position, move the hatch cover to the open position, or not move the hatch cover.

8. A hatch cover manager product for controlling a hatch cover covering a hatch opening on a walking surface, the product comprising:
   a controller having a processor,
   the controller, via the processor, responding to monitored conditions in accordance with programmable instructions;

the controller being signal-connected to a cover-open sensor and monitoring the cover-open sensor for a cover-open condition;

the controller being signal-connected to a timer and monitoring the timer for a time condition;

the controller being signal-connected to a cover actuator, and wherein the controller can respond to the cover-open condition and the time condition by causing the cover actuator to move the cover between an open position and a closed position.

9. The hatch cover manger product of claim 8 wherein the controller stores historical data on monitored conditions; and wherein the controller, via the processor, can respond to monitored conditions and historical data in accordance with programmable instructions.

10. A hatch cover system for covering a hatch opening in a walking surface, the cover system comprising:

a hatch;

a hatch cover;

a hatch cover manager comprising:

a controller, the controller being signal-connected to a cover-open sensor and monitoring the cover-open sensor for a cover-open condition;

the controller being signal-connected to a timer and monitoring the timer for an time condition;

the controller being signal-connected to a cover actuator and causing the cover actuator to move the cover from an open position to a closed position in response to the cover-open condition and the time condition.

* * * * *